US008819236B2

(12) United States Patent
Gkantsidis et al.

(10) Patent No.: US 8,819,236 B2
(45) Date of Patent: Aug. 26, 2014

(54) RESOURCE OPTIMIZATION FOR ONLINE SERVICES

(75) Inventors: Christos Gkantsidis, Cambridge (GB);
Thomas Karagiannis, Cambridge (GB);
Dushyanth Narayanan, Cambridge (GB); Antony Rowstron,
Cambridgeshire (GB)

(73) Assignee: Microsoft Corporation, Redmond, WA (US)

( * ) Notice: Subject to any disclaimer, the term of this patent is extended or adjusted under 35 U.S.C. 154(b) by 46 days.

(21) Appl. No.: 12/969,963

(22) Filed: Dec. 16, 2010

(65) Prior Publication Data
US 2012/0158858 A1 Jun. 21, 2012

(51) Int. Cl.
G06F 15/16 (2006.01)
G06F 15/173 (2006.01)

(52) U.S. Cl.
USPC ............ 709/226; 709/217; 709/206; 709/200

(58) Field of Classification Search
USPC .................................. 709/206, 217, 226, 200
See application file for complete search history.

(56) References Cited

U.S. PATENT DOCUMENTS

| 5,659,717 | A  * | 8/1997 | Tse et al. ........................ 716/122 |
| 6,928,485 | B1 * | 8/2005 | Krishnamurthy et al. ..... 709/242 |
| 7,085,771 | B2 * | 8/2006 | Chung et al. ............................ 1/1 |
| 7,668,957 | B2   | 2/2010 | Achlioptas et al. |
| 8,180,777 | B2 * | 5/2012 | Duchon et al. ................. 707/738 |
| 8,195,734 | B1 * | 6/2012 | Long et al. ..................... 708/520 |
| 8,271,006 | B1 * | 9/2012 | Gilbert et al. ................. 455/466 |
| 2004/0267686 | A1 * | 12/2004 | Chayes et al. ..................... 707/1 |
| 2006/0015504 | A1 * | 1/2006 | Yu et al. ........................... 707/10 |
| 2006/0015588 | A1 * | 1/2006 | Achlioptas et al. ............ 709/220 |
| 2006/0026229 | A1 * | 2/2006 | Ari et al. ......................... 709/203 |
| 2006/0095460 | A1 * | 5/2006 | Iyengar et al. ................. 707/102 |
| 2008/0010304 | A1 * | 1/2008 | Vempala et al. ............... 707/100 |
| 2008/0046441 | A1 * | 2/2008 | Wen et al. ...................... 707/100 |
| 2008/0052324 | A1 * | 2/2008 | Choubey et al. ............... 707/201 |
| 2008/0126523 | A1 * | 5/2008 | Tantrum et al. ............... 709/223 |
| 2009/0089244 | A1 * | 4/2009 | Donato et al. ..................... 707/3 |
| 2009/0144743 | A1 * | 6/2009 | Wolslegel ...................... 718/105 |
| 2009/0307099 | A1   | 12/2009 | Tanik et al. |

(Continued)

OTHER PUBLICATIONS

"METIS—Serial Graph Partitioning and Fill-reducing Matrix Ordering" Karypis, George. <2006-2011.http://glaros.dtc.umn.edu/gkhome/metis/metis/overview>.*

(Continued)

Primary Examiner — Liangche A Wang
Assistant Examiner — Johnny Aguiar
(74) Attorney, Agent, or Firm — Pablo Tapia; Jim Ross; Micky Minhas (57) ABSTRACT

Resource optimization for online services is described. In one example, objects (such as mailboxes or other data associated with an online service) are assigned to network elements (such as servers) by inferring a relationship graph from log data relating to usage of the online service. The graph has a node for each object, and connections between each pair of objects having data items in common. Each connection has a weight relating to the number of common data items. The graph is partitioned into a set of clusters, such that each cluster has nodes joined by connections with a high weight relative to the weight of connections between nodes in different clusters. The objects are then distributed to the network elements such that objects corresponding to nodes in the same cluster are located on the same network element.

20 Claims, 5 Drawing Sheets

(56) References Cited

U.S. PATENT DOCUMENTS

| | | | | |
|---|---|---|---|---|
| 2010/0115216 | A1* | 5/2010 | Jia et al. | 711/162 |
| 2010/0145771 | A1* | 6/2010 | Fligler et al. | 705/10 |
| 2011/0040764 | A1* | 2/2011 | Duchon et al. | 707/738 |
| 2011/0078112 | A1* | 3/2011 | Takata et al. | 707/622 |
| 2011/0264748 | A1* | 10/2011 | Pouzin et al. | 709/206 |
| 2012/0095996 | A1* | 4/2012 | Dumant et al. | 707/728 |

OTHER PUBLICATIONS

"METIS—Serial Graph Partitioning and Fill-reducing Matrix Ordering" Karypis, George. 2006-2010.<http://glaros.dtc.umn.edu/gkhome/metis/metis/overview>.*

"A new Community Division based on Coring Graph Clustering." Ling et al. Oct. 2010. Journal of Software, vol. 5, No. 10. 2010 Academy Publisher.*

Adamic, et al., "How to search a social network", retrieved on Sep. 7, 2010 at <<http://www.google.co.uk/url?sa=t&source=web&cd=2&ved=0CB4QFjAB&url=http%3A%2F%2Fciteseerx.ist.psu.edu%2Fviewdoc%2Fdownload%3Fdoi%3D10.1.1.126.2080%26rep%3Drep1%26type%3Dpdf&rct=j&q=How%20to%20search%20a%20social%20network&ei=0sCFTPuklsiOjAfkwJyOCA&usg=AFQjCNHzyqCvO_Uv137wsFBNNLQMLyNRAg>>, (Preprint as submitted Jan. 8, 2005) Social Networks, vol. 27, No. 3, 2005, pp. 187-203.

Agarwal, et al., "Volley: Automated Data Placement for Geo-Distributed Cloud Services", USENIX Association, Proceedings of Conference on Networked Systems Design and Implementation (NSDI), Apr. 2010, pp. 1-16.

Arora, et al., "Geometry, Flows, and Graph-Partitioning Algorithms", retrieved on Sep. 7, 2010 at <<http://www.cs.princeton.qjedu/~arora/pubs/arvcacm.pdf>>, Communications of the ACM, vol. 51, No. 10, Oct. 2008, pp. 96-105.

Bolosky, et al., "Single Instance Storage in Windows 2000", retrieved on Sep. 7, 2010 at <<http://www.usenix.org/events/usenix-win2000/full_papers/bolosky/bolosky.pdf>>, USENIX Association, Proceedings of Conference on USENIX Windows Systems Symposium, vol. 4, 2000, pp. 1-12.

Cai, et al., "Mining Hidden Community in Heterogeneous Social Networks", retrieved on Sep. 7, 2010 at <<http://citeseerx.ist.psu.edu/viewdoc/download?doi=10.1.1.130.5996&rep=rep1&type=pdf>>, Proceedings of Intl Workshop on Link Discovery (LinkKDD), Mar. 2005, pp. 58-65.

Cha, et al., "A Measurement-driven Analysis of Information Propagation in the Flickr Social Network", retrieved on Sep. 7, 2010 at <<http://www.ccs.neu.edu/home/amislove/publications/Flickr-WWW.pdf>>, ACM, Proceedings of Intl Conference on World Wide Web (WWW), Madrid, Spain, Apr. 2009, pp. 721-730.

Cha, et al., "I Tube, You Tube, Everybody Tubes: Analyzing the World's Largest User Generated Content Video System", retrieved on Sep. 7, 2010 at <<http://citeseerx.ist.psu.edu/viewdoc/download;jsessionid=C40208C006E282E8B430A45F2920BDCE?doi=10.1.1.119.1114&rep=rep1&type=pdf>>, ACM, Proceedings of Conference on Internet Measurement (IMC), San Diego, California, Oct. 2007, pp. 1-13.

Chun, et al., "Comparison of Online Social Relations in terms of Volume vs. Interaction: A Case Study of Cyworld", retrieved on Sep. 7, 2010 at <<http://stat.kaist.ac.kr/imc2008-chun.pdf>>, ACM, Proceedings of Conference on Internet Measurement (IMC), Vouliagmeni, Greece, Oct. 2008, pp. 57-70.

Dongarra, et al., "Sourcebook of Parallel Computing", Morgan Kaufmann Publishers, 2003, 842 pages.

Douceur, et al., "Reclaiming Space from Duplicate Files in a Serverless Distributed File System", retrieved on Sep. 7, 2010 at <<http://ieeexplore.ieee.org/stamp/stamp.jsp?tp=&arnumber=1022312>>, IEEE, Proceedings of Intl Conference on Distributed Computing Systems (ICDCS), 2002, pp. 617-625.

Eckmann, et al., "Entropy of dialogues creates coherent structures in e-mail traffic", retrieved on Sep. 7, 2010 at <<http://www.pnas.org/content/101/40/14333.full.pdf+html>>, Proceedings of National Academy of Science (PNAS), vol. 101, No. 40, Oct. 2004, pp. 14333-14337.

"From Data and Information Analysis to Knowledge Engineering", retrieved on Sep. 7, 2010 at <<http://citeseerx.ist.psu.edu/viewdoc/download;jsessionid=231C2A5522A0F6CD0B0202581866DDD1?doi=10.1.1.84.134&rep=rep1&type=pdf>>, Otto-von-Guericke-University, Program and Abstracts from Conference of the German Classification Society, Magdeburg, Germany, Mar. 2005, pp. 1-291.

Haghpanah, et al., "Approximating Relation Extraction for Community Mining in Heterogeneous Social Networks", retrieved on Sep. 7, 2010 at <<http://www.iadis.net/dl/final_uploads/200712L022.pdf>>, IADIS Intl Conference on WWW/ Internet (ICWI), Vila Real, Portugal, Oct. 2007, pp. 171-178.

Hendrickson, et al., "A MultiLevel Algorithm for Partitioning Graphs", retrieved on Sep. 7, 2010 at <<http://citeseerx.ist.psu.edu/viewdoc/download?doi=10.1.1.74.7235&rep=rep1&type=pdf>>, ACM, Proceedings of Conference on Supercomputing (CDROM), 1995, pp. 28-42.

Karagiannis, et al., "Behavioral Profiles for Advanced Email Features", retrieved on Sep. 7, 2010 at <<http://www2009.org/proceedings/pdf/p711.pdf>>, ACM, Proceedings of Intl Conference on World Wide Web (WWW), Madrid, Spain, Apr. 2009, pp. 711-720.

Karypis, et al., "A Fast and High Quality Multilevel Scheme for Partitioning Irregular Graphs", retrieved on Sep. 7, 2010 at <<http://citeseerx.ist.psu.edu/viewdoc/download?doi=10.1.1.39.3415&rep=rep1&type=pdf>>, Society for Industrial and Applied Mathematics (SIAM), Journal on Scientific Computing, vol. 20, No. 1, Aug. 1998, pp. 359-392.

Kossinets, et al., "Empirical Analysis of an Evolving Social Network Supporting Online Material", retrieved on Sep. 7, 2010 at <<http://www.sciencemag.org/cgi/data/311/5757/88/DC1/1>>, Science Magazine, vol. 311, No. 5757, Jan. 2006, pp. 88-90.

Kossinets, et al., "The Structure of Information Pathways in a Social Communication Network", retrieved on Sep. 7, 2010 at <<http://www.cs.cornell.edu/home/kleinber/kdd08-bb.pdf>>, ACM, Proceeding of Intl Conference on Knowledge Discovery and Data Mining (KDD), 2008, pp. 435-443.

Kriha, "The Dynamics of Social Media—How to build ultra large-scale systems", retrieved on Sep. 7, 2010 at <<http://www.kriha.de/krihaorg/dload/ultra.pdf>>, 2009, 331 pages.

Kuenning, "The Design of the Seer Predictive Caching System", retrieved on Sep. 7, 2010 at <<http://ieeexplore.ieee.org/stamp/stamp.jsp?tp=&arnumber=512732>>, IEEE Workshop on Mobile Computing Systems and Applications, Santa Cruz, California, 1995, pp. 37-43.

Kumar, et al., "Structure and Evolution of Online Social Networks", retrieved on Sep. 7, 2010 at <<http://wiki.cs.columbia.edu/download/attachments/1979/Structure+and+Evolution+of+Online+Social+Networks-kumar.pdf>>, ACM, Proceeding of Intl Conference on Knowledge Discovery and Data Mining (KDD), Philadelphia, Pennsylvania, Aug. 2006, pp. 611-617.

Leskovec, et al., "The Dynamics of Viral Marketing", retrieved on Sep. 7, 2011 at <<http://www.hpl.hp.com/research/idl/papers/viral/viral.pdf>>, ACM, Proceedings of Conference on Electronic Commerce (EC), 2006, pp. 228-237.

"METIS—Family of Multilevel Partitioning Algorithms", retrieved on Sep. 7, 2010 at <<http://glaros.dtc.umn.edu/gkhome/views/metis/,2009>>, George Karypis, 2006-2010, pp. 1.

Mislove, et al., "Exploiting Social Networks for Internet Search", retrieved on Sep. 7, 2010 at <<http://www.mpi-sws.org/~amislove/publications/PeerSpective-HotNets.pdf>>, Proceedings of Workshop on Hot Topics in Networks (HotNets), Irvine, California, Nov. 2006, pp. 1-6.

Mislove, et al., "Measurement and Analysis of Online Social Networks", retrieved on Sep. 7, 2010 at <<http://conferences.sigcomm.org/imc/2007/papers/imc170.pdf>>, ACM, Proceedings of Conference on Internet Measurement (IMC), San Diego, California, Oct. 2007, pp. 29-42.

Nazir, et al., "Unveiling Facebook: A Measurement Study of Social Network Based Applications", retrieved on Sep. 7, 2010 at <<http://wwwcsif.cs.ucdavis.edu/~raza/n_papers/imc08.pdf>>, ACM, Pro- (56) References Cited

OTHER PUBLICATIONS ceedings of Conference on Internet Measurement (IMC), Vouliagmeni, Greece, Oct. 2008, pp. 43-56.

"Private Communications", retrieved on Sep. 7, 2010 at <<http://www.ccdc.cam.ac.uk/products/csd/deposit/communications.php>>, The Cambridge Crystallographic Data Centre (CCDC), 2004-2011, pp. 1.

Pujol, et al., "The Little Engine(s) That Could: Scaling Online Social Networks", ACM SIGCOMM, New Delhi, India, 2010, pp. 375-386.

Seth, "Design of a Social Network Based Recommender System for Participatory Media Content", retrieved on Sep. 7, 2010 at <<http://www.cse.iitd.ernet.in/~aseth/systemdesignv3.pdf>>, University of Waterloo, 2008, pp. 109-117.

Shi, et al., "Networks of strong ties", retrieved on Sep. 7, 2010 at <<http://arxiv.org/PS_cache/cond-mat/pdf/0605/0605279v1.pdf>>, Physica A: Statistical Mechanics and its Applications, vol. 378, No. 1, 2007, pp. 33-47.

Soules, et al., "Connections: Using Context to Enhance File Search", retrieved on Sep. 7, 2010 at <<http://www.hpl.hp.com/personal/Craig_Soules/papers/sosp05.pdf>>, ACM, Proceedings of Symposium on Operating Systems Principles (SOSP), Brighton, United Kingdom, Oct. 2005, pp. 119-132.

Tolia, et al., "Opportunistic Use of Content Addressable Storage for Distributed File Systems", retrieved on Sep. 7, 2010 at <<http://www.cs.ucl.ac.uk/staff/b.karp/casper-usenix2003.pdf>>, USENIX Association, Annual Technical Conference, San Antonio, Texas, Jun. 2003, pp. 127-140.

Vazirani, "Approximation Algorithms", Springer-Verlag Berlin, 2001, pp. 1-378.

Zhu, et al., "Avoiding the Disk Bottleneck in the Data Domain Deduplication File System", retrieved on Sep. 7, 2010 at <<http://www.modcomp.com/pdf/Whitepapers/Storage/Data%20Domain/Data%20Domain%20-%20Avoiding%20the%20Disk%20Bottleneck.pdf>>, USENIX Association, Conference on File and Storage Technologies (FAST), San Jose, California, 2008, pp. 269-282.

\* cited by examiner

RESOURCE OPTIMIZATION FOR ONLINE SERVICES

BACKGROUND

Large-scale online services such as email services, social networking services, and media services have significant storage and bandwidth requirements. For example, an enterprise-scale e-mail system is a large, distributed online service. To support organizations with 50,000+ users, multiple servers are used with hundreds of terabytes of combined storage, often distributed across multiple data centers.

In many online service deployments, user data (e.g., profiles, accounts, mailboxes, etc.) are assigned to servers greedily. For example, user data is allocated to a server by choosing the server with the lowest storage utilization. If a server's storage utilization exceeds a threshold, data may be migrated to a new server to balance the storage load. Periodically, as all the servers become storage capacity bound, a new server is added. Hence, a key challenge for such online services is to improve the ratio between the offered quota and the actual storage provisioned.

The embodiments described below are not limited to implementations which solve any or all of the disadvantages of known online services.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Resource optimization for online services is described. In one example, objects (such as mailboxes or other data associated with an online service) are assigned to network elements (such as servers) by inferring a relationship graph from log data relating to usage of the online service. The graph has a node for each object, and connections between each pair of objects having data items in common. Each connection has a weight relating to the number of common data items. The graph is partitioned into a set of clusters, such that each cluster has nodes joined by connections with a high weight relative to the weight of connections between nodes in different clusters. The objects are then distributed to the network elements such that objects corresponding to nodes in the same cluster are located on the same network element.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an email system, the system described is provided as an example and not a limitation. As those skilled in the art will appreciate, the present examples are suitable for application in a variety of different types of online services.

Figure 1:
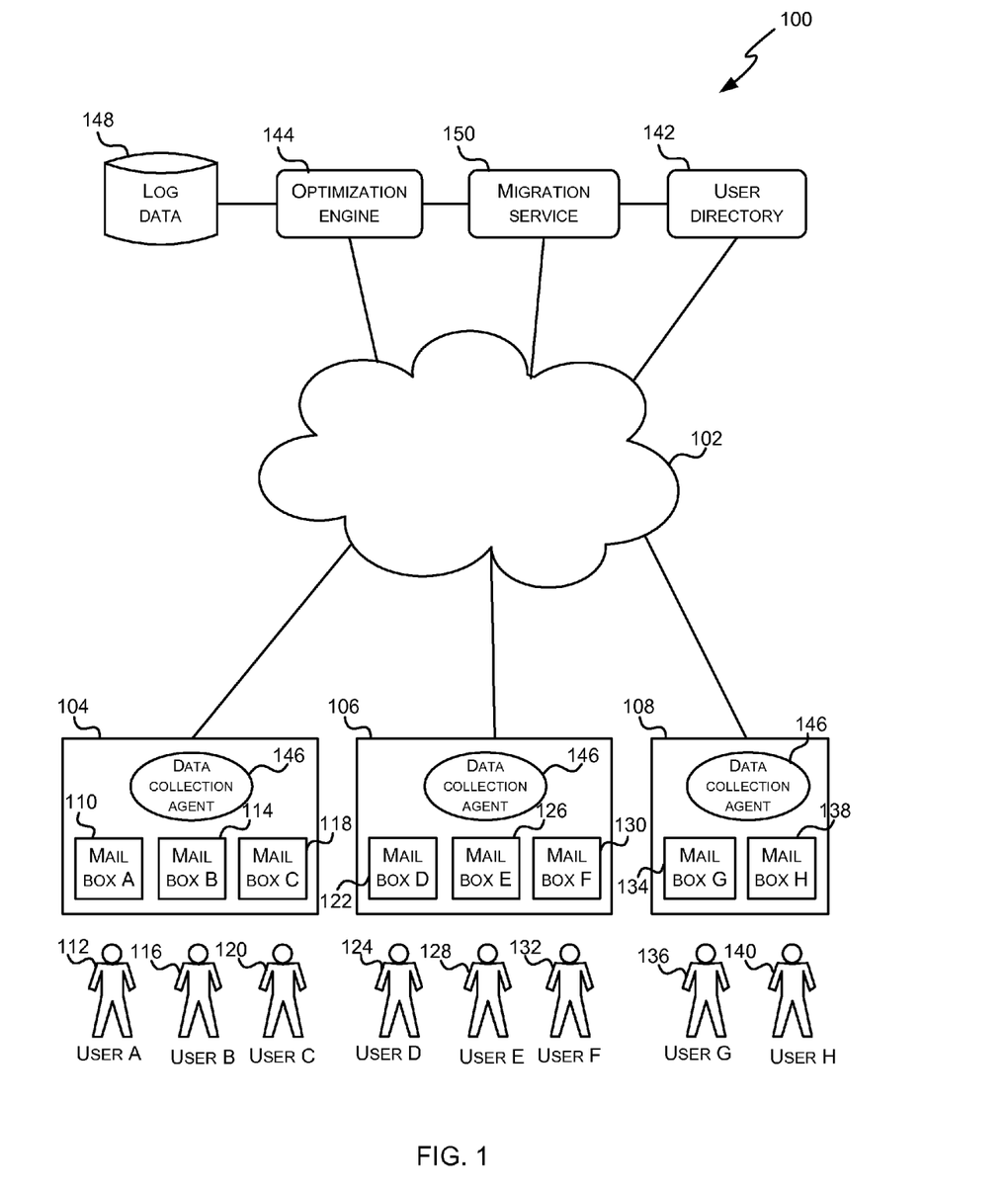
FIG. 1 illustrates a system implementing an online service.

Reference is first made to FIG. 1, which illustrates a system implementing an online service. In FIG. 1, the system is an email system 100, although this is merely an illustrative example, and the techniques described below can be applied to any other type of online service in which data is shared or in common between multiple entities.

The system 100 comprises a communication network 102, arranged to enable data communication between multiple entities of the system. The network 102 can be, for example, the interne or a private network, and can be a wireless, wired or mobile communication network, or any combination thereof. In communication with the network 102 are a plurality of network elements, such as servers. The example of FIG. 1 shows a first network element 104, a second network element 106 and a third network element 108. In other examples, different numbers of network elements can be present.

In the example email system 100 of FIG. 1, the network elements are email servers. Each of the network elements store one or more objects, which in the example of FIG. 1 are user mailboxes. The user mailboxes store data relating to the emails of a given user, including, for example, emails received, emails sent, and other data associated with the user's email account. FIG. 1 shows three mailboxes stored on the first network element 104: mailbox A 110 associated with a user A 112; mailbox B 114 associated with a user B 116; and mailbox C 118 associated with a user C 120. The second network element 106 is shows storing three mailboxes: mailbox D 122 associated with a user D 124; mailbox E 126 associated with a user E 128; and mailbox F 130 associated with a user F 132. The third network element 108 is shows storing two mailboxes: mailbox G 134 associated with a user G 136; and mailbox H 138 associated with a user H 140.

A user directory 142 is connected to the network 102, and maintains a record of the location of each of the user mailboxes on the network elements. Emails can be sent from one sending user to one or more recipient users by using the user directory to determine which network element the recipient user mailboxes are located on, and transmitting the email data over the communication network 102 to these network elements for storage in the appropriate mailboxes.

In alternative (non-email) examples, the network elements can store different objects. For example, in the case of a social network or online media sharing service, the objects stored on the network elements can be user account data, including for example profile information, photos, video or other media associated with the user. In another example, in the case of an online media streaming/download service, the objects stored on the network elements can be media items such as videos, music, images, e-books, or any other media type.

As stated above, the objects (such as email mailboxes) are generally allocated to the network elements greedily, for example by adding new objects to the network element having the lowest storage utilization. This introduces inefficiencies in both storage and bandwidth use. For example, in FIG. 1, mailbox A 110 has been allocated to the first network element 104, mailbox E 126 has been allocated to the second network element 106, and mailbox H 138 has been allocated to the third network element 108. If user A 112 sends an email to user E 128 and user H 140, then a copy of the same email is stored on each of the three network elements: a copy of the sent email in mailbox A 110, a copy of the received email in mailbox E 126, and a further copy of the received email in mailbox H 138. If these three mailboxes were located on the same network element, then these three copies could be coalesced, and only a single instance of the email stored, thereby saving storage and also network bandwidth in transmitting the email between network elements. However, it is not possible in practice to host all mailboxes (or other objects) on a single server.

Studies of a real, corporate email system have indicated that, on average, 4.6 users are referenced in each email header, either as sender or recipient. This implies that, in the worst case where each mailbox resides on a different e-mail server, each e-mail is stored 4.6 times on the average.

A similar issue arises whenever there is data in common between elements of an online service. For example, in the social network or media sharing service mentioned above, there can be several instances of the same photo, video, or other media stored in association with different user accounts on different network elements. This would therefore also benefit from the co-location of the user accounts and the coalescing of the shared data.

In another example, in the case of a media streaming/download service, it can be determined that certain users tend to consume the same media (e.g. streamed videos). In such cases, benefits are obtained by co-locating these users on the same network element and caching the media items at the network element such that when one user consumes the media, it is already present for similar users who are likely to want to consume it as well, thereby improving latency. In a further example, groups of media items such as videos can be determined to be consumed together, and these groups can be co-located on network elements, such that a user only has to access a single network element to consume media items in this group.

In order to achieve the benefits of co-locating certain objects together on certain network elements, the system 100 of FIG. 1 comprises an optimization engine 144. The operation of the optimization engine is described in more detail with reference to FIG. 2 below, and more detail on the internal structure of the optimization engine is provided with reference to FIG. 5. The optimization engine 144 determines how to allocate the objects to the network element in order to improve storage utilization, the rate of per-user I/O operations (IOP), bandwidth and/or latency (over local and/or wide-area networks) using data relating to the usage of the online service. The data relating to the usage of the online service is provided by a data collection agent 146 executed on each of the network elements. The data from the data collection agents 146 is collated and stored by the optimization engine in a log data store 148. Note that, in other examples, a centralized data collection scheme can be used instead of a distributed data collection mechanism such as that shown in FIG. 1.

The optimization engine 144 generates as its output an allocation of objects to network elements, and this is passed to a migration service 150, which moves the objects to be re-allocated to their new network elements, and updates the user directory 142. The re-allocation can be performed immediately, or at a predefined time in the future (e.g. during a low usage period) as described in more detail below.

Figure 2:
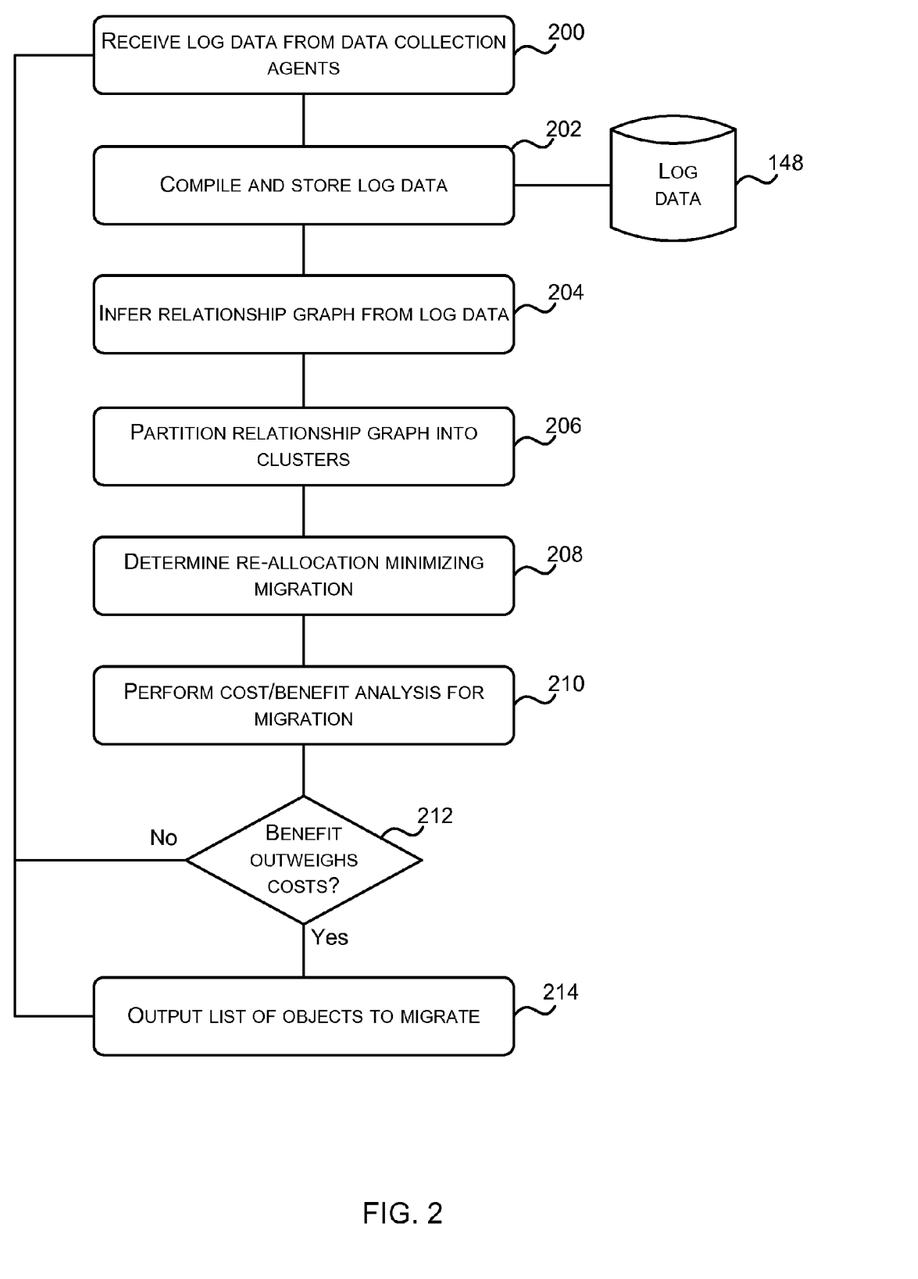
FIG. 2 illustrates a flowchart of an optimization process for the online service.

Reference is now made to FIG. 2, which illustrates a flowchart of an optimization process performed by the optimization engine 144 of FIG. 1. Firstly, the optimization engine 144 receives 200 log data relating to usage of the network elements in the system. For example, the optimization engine 144 can receive the log data from the data collection agents 146 executed on each of the network elements. In the example of an email system, the log data can relate to the emails sent from and/or received at each network element. For example, the log data for an email system can comprise the email addresses of the sender and recipients, a timestamp, the email size, and an email identifier. In another example, the log data for a social network or media sharing service can relate to media items shared between users of the service. In a further example, the log data for a media streaming/download service can be data relating to which media items are consumed by users (e.g. consecutively or together).

Once the log data has been received by the optimization engine 144, it is compiled to form an overall record of the usage of the online service and stored 202 in the log data store 148. The optimization engine 144 then uses the overall log data to infer 204 a relationship graph. A relationship graph is also known as a social graph, and is a graphical representation of the interconnectedness of entities. A relationship graph comprises a plurality of nodes and connections (known as edges) between nodes that have some form of relationship. The relationship graph formed by the optimization engine 144 comprises a node (or vertex) for each object (e.g. mailbox), and connections are formed between nodes having a relationship derived from the log data. For example, a pair of nodes are connected when the objects associated with the pair of nodes have at least one data item in common.

Figure 3:
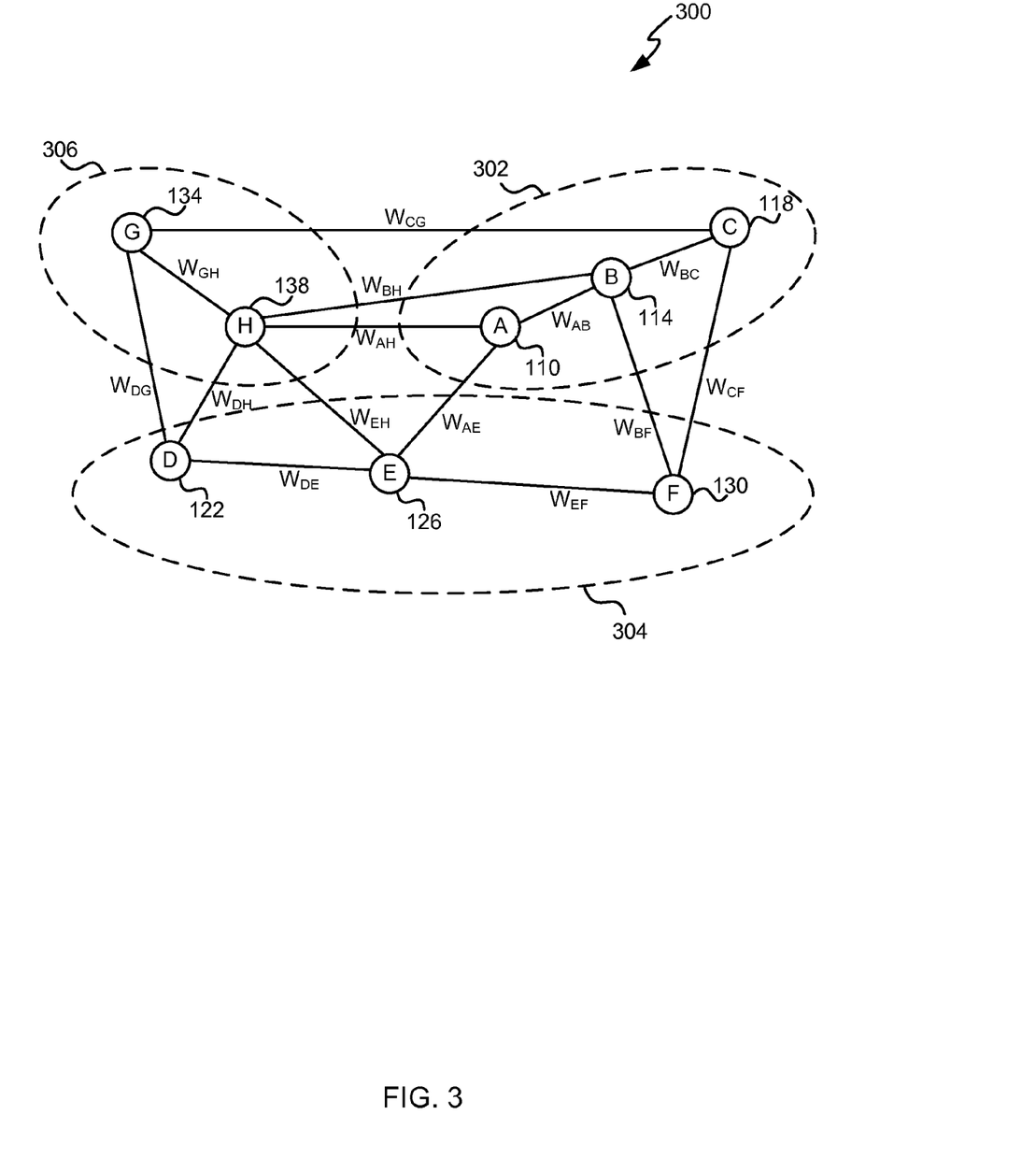
FIG. 3 illustrates an example relationship graph.

An example relationship graph for the email system of FIG. 1 is illustrated in FIG. 3. FIG. 3 shows a relationship graph 300 with a node for each of the mailboxes A to H in FIG. 1. Connections join the nodes if the log data indicates that those two nodes (mailboxes) have communicated by email. In other words, the data item in common between the two nodes is an email. For example, the relationship graph 300 indicates that user A 112, via mailbox A 110, has communicated with mailbox B 114 (i.e. user B 116), mailbox E 126 (i.e. user E 128), and mailbox H 138 (i.e. user H 140) by email, as shown by connections between these nodes in FIG. 3. Conversely, user A 112, via mailbox A 110, has not communicated (for example) with mailbox F 130 (i.e. user F 132), as indicated by the absence of a connection between this pair of nodes.

In alternative examples, the nodes can represent different objects, such as user account data or media items, and the data items in common giving rise to the connections can be media items shared between user accounts or user accounts consuming the same media. Note that the optimization engine 144 does not necessarily generate a pictorial view of the relationship graph such as that in FIG. 3, but the information can instead be formed as a table, matrix or other data structure representing the same data.

In order to indicate the "strength" or "closeness" of the relationship between the nodes of the relationship graph 300, the optimization engine 144 can generate a weight for each connection between a pair of objects. The weight is related to the number of data items in common between the pair of objects. For example, in the case of the email service, the weight is related to the number of emails sent between a pair of mailboxes, such that the higher the number of emails sent between a pair of mailboxes, the stronger the relationship between the two users. The weight (denoted $w_{XY}$ for the connection between two nodes X and Y in FIG. 3) is calculated from the log data and stored in association with each connection.

In one example, for the email system, the weight can be in the form of a message counter, wherein for each email sent between a pair of mailboxes a value determined by the inverse of the number of recipients of each email sent between the pair of nodes, i.e. 1/(number of recipients), is added to the weight of the connection joining that pair of mailboxes. The division by the number of recipients of the email reduces the weight of "broadcast" emails or emails with large numbers of recipients, which are less indicative of a relationship between the users.

In another example, the weight can be in the form of a size counter relating to the size of emails sent between the pair of nodes associated with that connection. For example, to determine the size counter, for each email sent, a value determined by the email size divided by the number of recipients of each email sent between the pair of nodes, i.e. s/(number of recipients), is added to the added to the weight of the connection joining that pair of mailboxes, where s is the size (e.g. in bytes) of the email. This captures the strength of a relationship between users in terms of the size of the emails sent, and, the division by the number of recipients of the email reduces the weight of "broadcast" emails.

Note that, in further examples, the weight can also be derived from any suitable combination of the message counter and size counter above. In some examples, the weight can be determined entirely by the optimization engine 144. In other examples, the data collection agents 146 can derive (at least partial) weights for objects at their local network element, whilst monitoring the usage of the online service at that network element. These (partial) weights from each data collection agent 146 can then be sent to the optimization engine 144 and combined to form the overall weight for the relationship graph.

For illustrative purposes, FIG. 3 also shows the objects grouped by their current allocation to the network elements. For example, dashed line 302 groups the objects currently allocated to the first network element 104 in FIG. 1, dashed line 304 groups the objects currently allocated to the second network element 106, and dashed line 306 groups the objects currently allocated to the third network element 108.

Returning again to FIG. 2, once the relationship graph 300 has been inferred and the weights for the connections determined, the optimization engine 144 then partitions 206 the relationship graph into a set of clusters of "strongly" connected objects. In other words, the optimization engine 144 clusters together objects having connections with a high weight (relative to the weight of other connections). The goal of the partitioning operation is to divide the relationship graph into groups (clusters) such that the weights of connections joining objects in different groups are as small as possible. More formally, the partitioning operation selects clusters such that it minimizes the sum of the weights of connections joining objects in different clusters. In addition, the partitioning operation aims to balance the number of objects in each cluster.

In one example, the optimization engine 144 can utilize METIS, which is a multi-level graph partitioning algorithm.

For example, the optimization engine 144 can implement a pMETIS algorithm, which works hierarchically by first transforming the graph to a series of smaller graphs (known as coarsening), then partitioning the smaller graphs, and finally uncoarsening the partitions. During this process the pMETIS algorithm tries to minimize the sum of connection weights between partitions while balancing the number of objects per partition.

In alternative examples, a different METIS algorithm can be used, such kMETIS. In kMETIS, the coarsening of the graph is performed directly into k parts, instead of following a recursive procedure. Other examples can also use different multi-level partitioning algorithms or any other suitable algorithm for solving the partitioning problem.

As an alternative to the METIS algorithm, the optimization engine 144 can use a different technique for partitioning the graph. For example, the optimization engine can partition the graph by thresholding the connection weights, such that connections having a weight less than a predefined threshold are removed. The clusters are then formed of objects having connections remaining between them. Such a thresholding technique can be adaptive, such that the threshold is progressively increased until a sufficient number of connections are removed to leave a target number of clusters.

Figure 4:
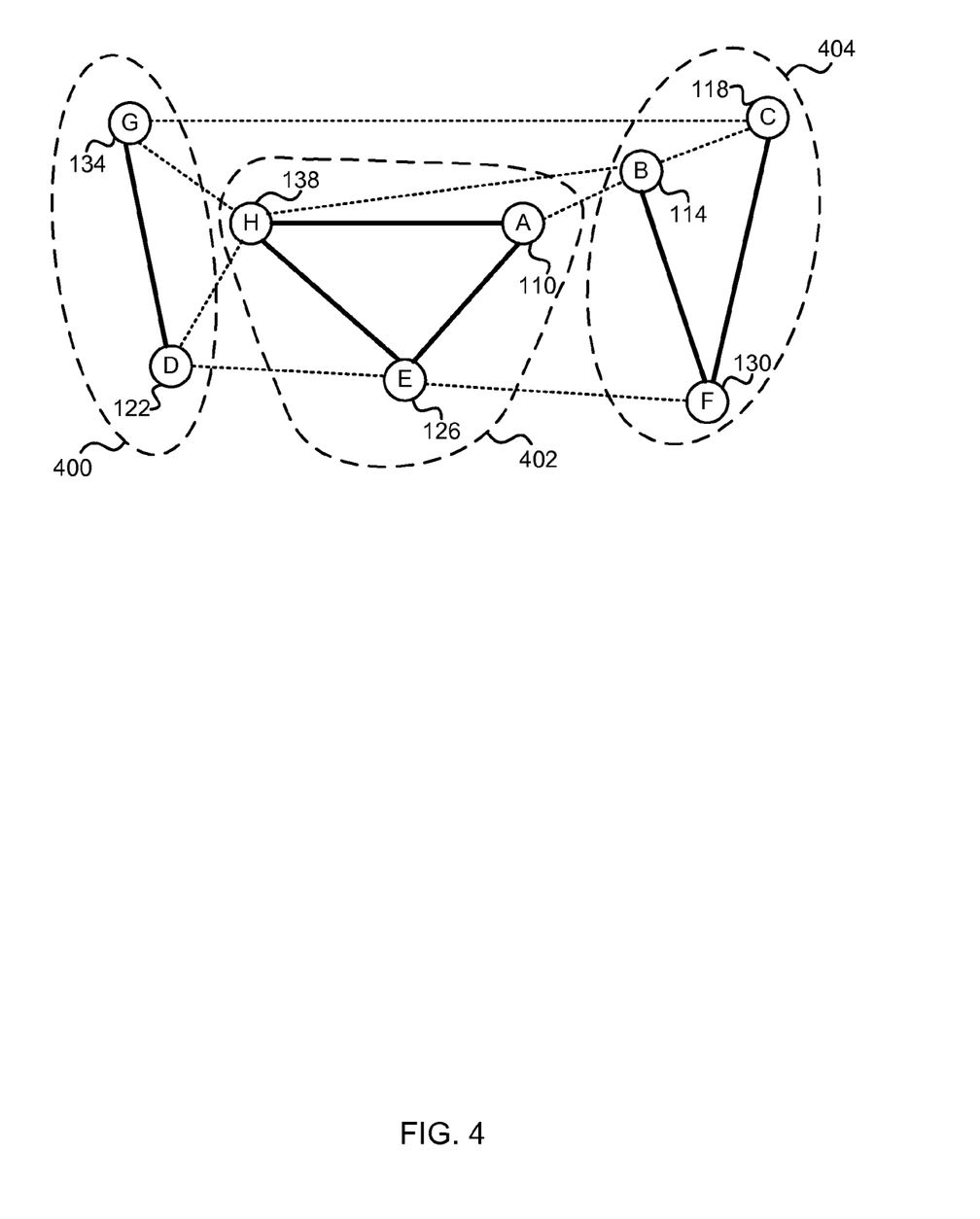
FIG. 4 illustrates the example relationship graph following a partitioning operation.

An example of a partitioned relationship graph is illustrated with reference to FIG. 4. FIG. 4 shows the same relationship graph 300 as FIG. 3, but after a partitioning operation. In this illustrative example, objects D 122 and G 134 are strongly connected (as indicated by a solid line connecting these objects), object H 138 is strongly connected to object A 110 and E 126, object A 110 is strongly connected to object E 126, and object F 130 is strongly connected to object B 114 and C 118. The remaining connections are shown with dotted lines to indicate connections that are not as strong. In other words, the connections shown with solid lines in FIG. 4 have a higher weighting (i.e. a stronger connection) that those shown with dotted lines.

By considering the weights associated with the connections, the partitioning operation generates three clusters. A first cluster 400 comprises objects D 122 and G 134, a second cluster 402 comprises objects A 110, E 126 and H 138, and a third cluster comprises objects B 114, C 118 and F 130. It can therefore be seen that only weak (dotted line) connections connect objects in different clusters, and strongly connected objects are located within the same cluster. From a practical viewpoint, in the case of the email system, this means that users that email each other frequently, such as users A, E and H are located in the same cluster.

Note that the example shown in FIG. 4 is merely illustrative, and a real relationship graph can have many more objects and connections. In some online services, the size of the resulting relationship graph can be very large, for example comprising several million objects. In these instances, the social graph can be too large to fit in the memory of some computing devices implementing the partitioning operation. In such cases, an optional preprocessing operation can be performed to reduce the size of the relationship graph prior to the partitioning operation.

The preprocessing "coarsens" the graph to a level that centralized computation by the partitioning operation is feasible. The coarsening process can be distributed. The coarsening is achieved by selecting strongly connected nodes in the relationship graph (i.e., nodes connected with large weights), merging these selected nodes together, and subsequently treating these merged nodes as a single node. Each coarsening round can reduce the size of the relationship graph by around a factor of two, thereby reducing the memory requirements.

The results produced from partitioning the coarsened graph are an approximation of the results from the unmodified graph; for example, merged nodes are subsequently located in the same cluster (which they were likely to be anyway after partitioning).

A further optional operation can also be performed on the relationship graph prior to partitioning, in order to further reinforce the strength of connections between nodes. The relationship graph can be represented as a matrix with each row and column representing a node, and the values in the matrix representing the weight between the nodes at that row and column. By multiplying this matrix by the transpose of itself, this reinforces "strong" connections by increasing their weights relative to low-value or zero weights.

Returning again to FIG. 2, once the relationship graph 300 has been partitioned into the set of clusters, the optimization engine 144 determines how to reallocate 208 the objects to the network elements, such that objects in the same cluster are located on the same network element. This operation takes into account the current allocation of objects to network elements (e.g. as determined from the user directory 142), and determines how to reallocate the objects to achieve the result of having objects in the same cluster on the same network element, whilst minimizing the number of objects moves (and hence bandwidth use).

In one example, the re-allocation of objects to network elements can be determined using a scratch-remap repartitioning algorithm, in order to minimize the networking costs in redistributing the objects. The output of the re-allocation determination is a list of objects that have been chosen to be moved from their current network element to a different network element.

Optionally, before moving the chosen objects to their new network elements, a cost-benefit analysis can be performed 210 to determine whether the benefits from moving the objects outweigh the costs of performing the move. In one example, this can be performed by the optimization engine 144, or in other examples, this can be performed by another part of the system, depending on whether the optimization engine has access to the cost information used.

A cost-benefit analysis is useful because, while the optimization engine 144 can provide an optimal partitioning from a graph perspective, this partitioning might not be practical from an application perspective. For example, the overhead of moving a large number of objects to new network elements can be significant, and thus not desirable operationally. This is exacerbated as the optimization process is not run just once to optimize the allocation of objects to network elements. Instead, as new users are introduced to the service, and relationships across objects evolve over time, the graph and clusters are periodically updated. As a result, the benefit obtained from moving objects is not constant over time, but degrades as the graph evolves.

To perform the cost-benefit analysis, once the new re-mapping of objects-to-network elements is decided, the optimization engine 144 (or other entity) evaluates the objects to be migrated and the associated cost. Migration costs relate to the rate by which the graph under consideration evolves. The rate impacts both the re-partitioning benefits and the associated cost of migrations to achieve the optimal allocation. For example, it is possible that when an allocation of objects is close to the optimal, the cost of migrations to gain the extra benefits outweighs the actual benefits; thus, re-partitioning is not beneficial at that specific point in time. The re-partitioning rate also relates to the cost of resources themselves. For an online service, the bandwidth cost may be significantly less than the storage cost, and the overhead of migration and the expected benefits is therefore a function of these costs.

The optimization engine 144 (or other entity) empirically determines the re-partitioning rate through the use of the cost-benefit analysis provided to the online service. For example, after re-partitioning, the optimization engine 144 estimates both a measure of networking overheads (i.e. the migration costs) and a measure of obtainable benefits, and then translates both the cost and the benefits to actual resource usage and prices. It is then determined 212 whether the benefits outweigh the costs of migrating the objects to new network elements at this time.

If it is determined 212 that benefits do not outweigh the costs of migrating the objects to new network elements, then the process of FIG. 2 reverts to the collection of data from the network elements, and the optimization process repeats, for example after a predetermined time period has elapsed. Conversely, if it is determined 212 that benefits do outweigh the costs of migrating the objects to new network elements, then a command is output 214 (e.g. to the migration service 150) comprising the list of objects to be moved to new network elements, and the process repeats.

The migration service 150 then transits commands to migrate the objects to their new network elements, in accordance with the output from the optimization process. In some examples, this can be performed immediately. In other examples, the migration service can perform this at a later time, such as during a period of low use of the online service (e.g. during the night for a user associated with an object to be migrated). The migration service 150 updates the user directory 142 once the objects have been moved.

Once the objects have been moved to the new network elements, then a coalescing operation can be performed. The coalescing operation selects the common data items that exist between the objects on the same network element, and coalesces (i.e. merges) them such that only a single instance of each common data item is present on the network element. This therefore reduces the storage usage at the network element.

The above-described optimization process can improve resource usage in an online service significantly. For example, for an email service, following the optimization process and the coalescing at the network elements, a single copy of an e-mail is stored at most once per server, even if multiple mailboxes stored on the server received copies of that e-mail. This provides benefit even for e-mails with a single recipient, as usually the sender also stores a copy of the e-mail in the "sent items" folder of their mailbox. Enabling storage coalescing by clustering objects as described above reduces the storage used to support the same user quota requirements. As a further benefit, it also reduces the network bandwidth used to deliver e-mails between users.

In a real-world email system, the above described system and optimization process has been found to achieve storage savings of 37%, and bandwidth savings of 50% compared to "greedy" allocation techniques. The relationship graph for this email system was also found to be stable for several weeks, and hence repeated re-allocation of the mailboxes could be performed infrequently, i.e. without introducing significant further overheads.

Figure 5:
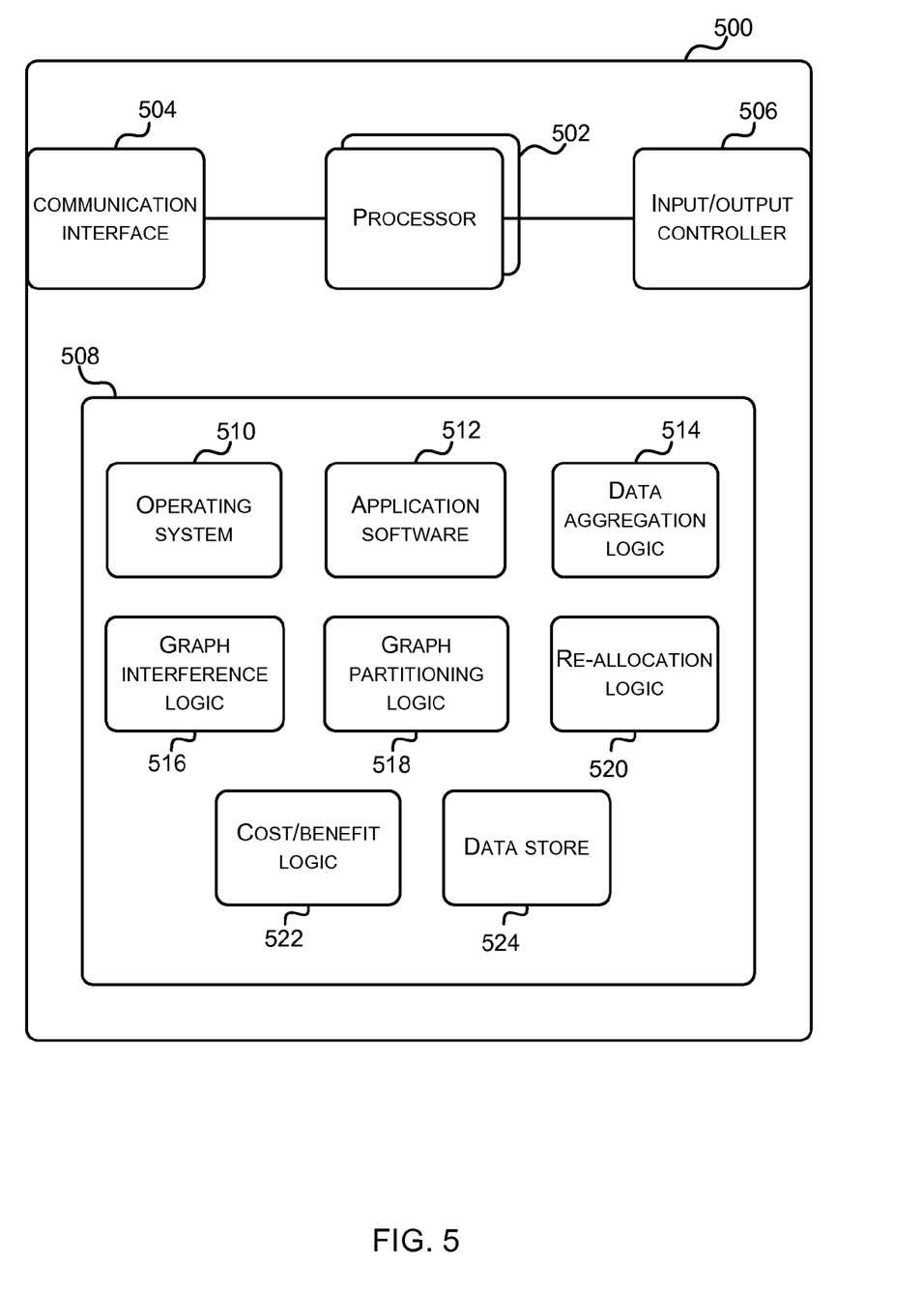
FIG. 5 illustrates an exemplary computing-based device in which embodiments of the optimization process may be implemented.

Reference is now made to FIG. 5, which illustrates various components of a computing device 500 which can implement the optimization engine 144 described hereinabove. Computing device 500 may be implemented as any form of a computing and/or electronic device in which the processing for the optimization engine may be implemented.

Computing device 500 comprises one or more processors 502 which may be microprocessors, controllers or any other suitable type of processor for processing computing executable instructions to control the operation of the device in order to implement the relationship graph-based optimization techniques. In some examples, for example where a system on a chip architecture is used, the processors 502 may include one or more fixed function blocks (also referred to as accelerators) which implement a part of the optimization method in hardware (rather than software or firmware).

The computing-based device 500 also comprises a communication interface 504, which can be arranged to communicate with one or more communication networks. For example, the communication interface 504 can connect the computing device 500 to the network 102 (e.g. the internet) for communicating with the network elements and data collection agents 146. The communication interface 504 can enable the computing device 500 to communicate with other elements of the system such as the log data store 148 (to store and retrieve data) and the migration service 150.

Optionally, the computing-based device 500 also comprises an input/output controller 506 arranged to output display information to a display device which may be separate from or integral to the computing-based device 500. The display information may provide a graphical user interface. The input/output controller 506 can also be arranged to receive and process input from one or more devices, such as a user input device (e.g. a mouse or a keyboard). In an example, the display device may also act as the user input device if it is a touch sensitive display device. The input/output controller 506 may also output data to devices other than the display device.

Computer-executable instructions and data storage can be provided using any computer-readable media that is accessible by computing device 500. Computer-readable media may include, for example, computer storage media such as memory 508 and communications media. Computer storage media, such as memory 508, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (such as memory 508) is shown within the computing device 500 it will be appreciated that the storage may be distributed or located remotely and accessed via a network or other communication link (e.g. using communication interface 504).

Platform software comprising an operating system 510 or any other suitable platform software may be provided at the memory 508 of the computing device 500 to enable application software 512 to be executed on the device. The memory 508 can store executable instructions to implement: data aggregation logic 514 arranged to aggregate the usage data from the data collection agents 146 and store it in the log data store 148; graph inference logic 516 arranged to derive the relationship graph from the log data; graph partitioning logic 518 arranged to cluster the objects in the graph; re-allocation logic 520 arranged to determine an efficient way to migrate the objects in accordance with the clusters; and (optionally) cost-benefit logic 522 arranged to perform the cost-benefit analysis. The memory 508 can also provide a data store 524, which can be used to provide storage for data used by the processors 502 when performing the optimization.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of allocating a plurality of objects associated with an online service to a plurality of network elements, comprising:
   receiving log data relating to usage of the online service;
   inferring a relationship graph from the log data, the relationship graph comprising a node for each object and connections between pairs of nodes,
   wherein each connected pair of nodes corresponds to a pair of objects having at least one associated data item in common, the at least one associated data item being different from both of the connected pair of nodes, and
   wherein each of the connections between the pairs of nodes is assigned a weight value relating to a number of common data items between a corresponding pair of objects;
   partitioning the relationship graph into a set of clusters, each cluster comprising pairs of nodes joined by connections having similar weight values, relative to weight values of connections between nodes in different clusters;
   distributing one or more of the objects to at least one of the plurality of network elements based on the clusters in the relationship graph, objects corresponding to nodes in a same cluster being co-located at a same network element; and
   coalescing, subsequent to distributing, a plurality of common data items of objects located at the same network element, resulting in only a single instance of the plurality of common data items being stored at the same network element and a reduction in the number of instances of each of the plurality of common data items across the plurality of network elements, at least a first common data item of the plurality of common data items having been stored on a different network element from the same network element prior to distributing.

2. A method according to claim 1, further comprising, prior to partitioning the relationship graph, selecting nodes joined by connections having a similar weight values relative to other connections, and merging the selected nodes to form single merged nodes.

3. A method according to claim 1, wherein the distributing further comprises determining a set of objects to move between network elements in order to co-locate objects in a cluster on a same server, a number of objects that are distributed being minimized.

4. A method according to claim 3, wherein the distributing further comprises determining a measure of networking overhead required for moving the set of objects between the network elements, and a measure of networking benefits obtainable by moving the set of objects between the network elements, and moving the set of objects between the network elements if a ratio value of the measure of networking overhead to the measure of networking benefits is determined not to exceed a predetermined value.

5. A method according to claim 1, wherein:
   the online service is an email service;
   the plurality of objects are associated with user mailboxes;
   the at least one associated data item in common is at least one email communicated between a pair of user mailboxes; and
   the log data comprises data relating to the at least one email communicated between the pair of user mailboxes.

6. A method according to claim 5, wherein each weight value for each connection is associated with a message counter value of a number of emails communicated between a pair of mailboxes associated with a pair of nodes joined by that connection.

7. A method according to claim 6, wherein the message counter value is determined by summing the inverse of a number of recipients of each email communicated between the pair of user mailboxes.

8. A method according to claim 5, wherein the weight value for each connection is associated with a size counter value of a size of each email communicated between a pair of mailboxes associated with a pair of nodes joined by that connection.

9. A method according to claim 8, wherein the size counter value is determined by summing the email size for each email communicated between the pair of mailboxes divided by the number of recipients of each email sent between the pair of nodes.

10. A method according to claim 1, wherein:
    the online service is a social network service;
    the plurality of objects are associated with user accounts;
    the at least one associated data item in common is at least one account item shared between a pair of user accounts; and
    the log data comprises data relating to the at least one account item shared between the pair of user accounts.

11. A method according to claim 1, wherein:
    the online service is an online media provider service;
    the plurality of objects are associated with media content;
    the at least one associated data item in common is at least one media content consumed by a plurality of users of the media provider service; and
    the log data comprises data relating to the at least one media content consumed by the plurality of users of the media provider service.

12. A method according to claim 1, further comprising, prior to partitioning the relationship graph, multiplying the relationship graph by a transpose of itself.

13. A method according to claim 1, wherein the partitioning the relationship graph into a set of clusters further comprises defining the clusters, a sum of weight values of connections between pairs of nodes amongst clusters being minimized.

14. A method according to claim 1, wherein the partitioning the relationship graph into a set of clusters further comprises applying a METIS multi-level graph partitioning algorithm to the relationship graph.

15. A method according to claim 1, wherein the partitioning the relationship graph into a set of clusters further comprises removing connections between pairs of nodes determined to have a weight value less than a predefined threshold value.

16. A method according to claim 15, wherein partitioning the relationship graph into a set of clusters further comprises increasing the predefined threshold value and repeating the removing and increasing until a target number of clusters is reached.

17. An optimization engine for an online service, comprising:

a communication interface configured to receive allocation data describing an allocation of a plurality of objects located on a plurality of network elements associated with the online service, and log data relating to usage of the online service; and one or more processors configured to:

infer a relationship graph from the allocation data and the log data, the relationship graph comprising a node for each object and connections between pairs of nodes, each connected pair of nodes corresponding to a pair of objects having at least one associated data item in common, and each of the connections between the pairs of nodes having an assigned weight value relating to a number of common data items between a corresponding pair of objects;

partition the relationship graph into a set of clusters, each cluster comprising pairs of nodes joined by connections having similar weight values relative to weight values of connections between nodes in different clusters;

control the communication interface to issue commands to reallocate one or more of the objects to at least one of the plurality of network elements based on the clusters in the relationship graph, objects corresponding to nodes in a same cluster being co-located at a same network element; and coalesce, subsequent to controlling the interface to issue the commands to reallocate one or more of the objects, a plurality of common data items of objects located at the same network element, resulting in only a single instance of the plurality of common data items being stored at the same network element and a reduction in the number of instances of each of the plurality of common data items across the plurality of network elements, at least a first common data item of the plurality of common data items having been stored on a different network element from the same network element prior to reallocating, a first object having been reallocated to the same network element and associated with the at least first common data item including the at least first common data item and additional data items.

18. An optimization engine according to claim 17, wherein the plurality of network elements are network servers.

19. An optimization engine according to claim 17, wherein each of the plurality of network elements associated with the online service comprises a data collection agent that tracks usage of the online service at its associated network element.

20. A computer-implemented method associated with an email service, for allocating a plurality of user mailboxes amongst a plurality of servers, comprising:

collecting log data from each of the plurality of servers, the log data for each server comprising information relating to emails communicated between pairs of user mailboxes located at that server;

inferring a relationship graph from the log data, the relationship graph comprising a node for each user mailbox of the email service and connections between pairs of nodes, each connected pair of nodes corresponding to a pair of user mailboxes that have communicated by email, and each of the connections between the pairs of nodes having an assigned weight value relating to a number of emails communicated between a corresponding pair of user mailboxes;

partitioning the relationship graph into a set of clusters, each cluster comprising pairs of nodes joined by connections having similar weight values, relative to weight values of connections between nodes in different clusters;

distributing the plurality of user mailboxes to at least one of the plurality of servers based on the clusters in the relationship graph, user mailboxes corresponding to nodes in a same cluster being co-located at a same server; and coalescing, subsequent to distributing, a plurality of common data items of nodes located at the same server, the plurality of common data items including two or more instances of a first common data item, resulting in only a single instance of the first common data item being stored at the same server and a reduction in the number of instances of each of the plurality of common data items across the plurality of servers, at least a first instance of the two or more instances having been stored on a different server from the same server prior to distributing, the first common data item being an e-mail message.

* * * * *